US012398856B2

(12) United States Patent
Hackl et al.

(10) Patent No.: US 12,398,856 B2
(45) Date of Patent: Aug. 26, 2025

(54) ILLUMINATION DEVICE FOR A MOTOR VEHICLE HEADLIGHT

(71) Applicant: ZKW Group GmbH, Wieselburg (AT)

(72) Inventors: Siegmar Hackl, Linz (AT); Jakob Pühringer, Vienna (AT); Markus Danner, Ollersdorf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/025,079

(22) PCT Filed: Jul. 26, 2021

(86) PCT No.: PCT/EP2021/070886
§ 371 (c)(1),
(2) Date: Mar. 7, 2023

(87) PCT Pub. No.: WO2022/063461
PCT Pub. Date: Mar. 31, 2022

(65) Prior Publication Data
US 2025/0075871 A1 Mar. 6, 2025

(30) Foreign Application Priority Data
Sep. 25, 2020 (EP) .................................... 20198338

(51) Int. Cl.
*F21S 41/275* (2018.01)
*F21S 41/147* (2018.01)
(Continued)

(52) U.S. Cl.
CPC ........... *F21S 41/275* (2018.01); *F21S 41/147* (2018.01); *F21S 41/322* (2018.01); *F21W 2102/18* (2018.01)

(58) Field of Classification Search
CPC .................................................... F21S 41/275
See application file for complete search history.

(56) References Cited

U.S. PATENT DOCUMENTS

2015/0219299 A1 8/2015 Hagedorn et al.
2016/0025291 A1 1/2016 Iwasaki
2016/0169468 A1 6/2016 Björn et al.

FOREIGN PATENT DOCUMENTS

AT 8253 U1 4/2006
DE 102011114636 A1 * 4/2013 ............ F21S 41/255
(Continued)

OTHER PUBLICATIONS

International Search Report for PCT/EP2021/070886 dated Sep. 29, 2021 (15 pages).
(Continued)

*Primary Examiner* — Sean P Gramling
(74) *Attorney, Agent, or Firm* — Eversheds Sutherland (US) LLP

(57) ABSTRACT

Illumination device (10) for a motor vehicle headlight, which illumination device (10) comprises the following:
- at least one light module (11) for producing dipped beam distribution having at least one light source, which is designed to emit light,
- a bulb shield (20) having an optically relevant shield edge for producing an asymmetrical cut-off line, wherein the light module (11) is arranged on an upper side of the bulb shield (20) in the installed position of the illumination device (10) in a motor vehicle headlight and cooperates in combination with the optically relevant shield edge of the bulb shield (20) to produce dipped beam distribution,
- a projection lens (100) with an optical axis (B), which projection lens (100) is designed to image the light that can be produced by the light module in front of the illumination device (10) in a main emission direction, wherein the projection lens (100) has a light entry surface (110) and a convex light emitting surface (120) opposite the light entry surface (110), wherein the (Continued)

Figure 1:
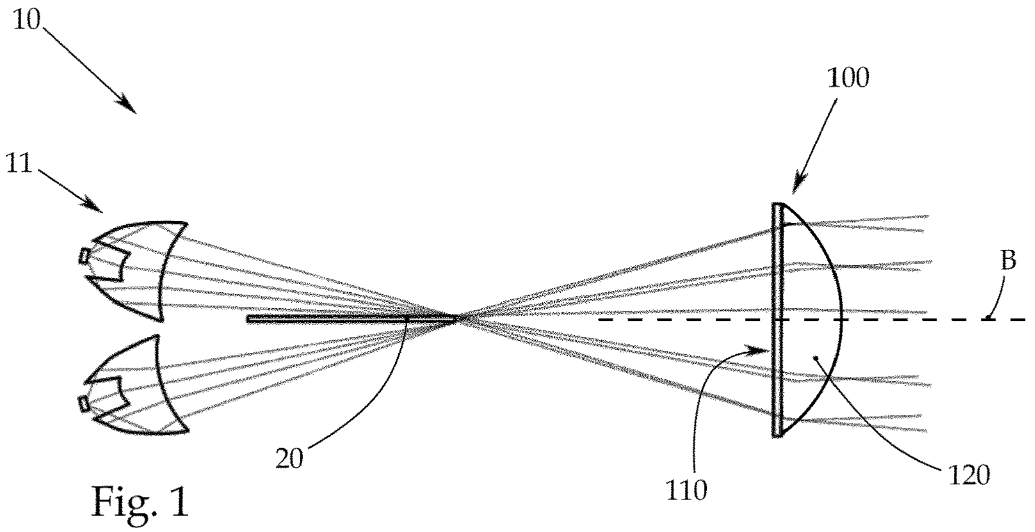

projection lens (100) comprises an optical device (200) arranged on the projection lens, which comprises a plurality of free-form lenses (210) each having an active surface (211), wherein the optical device is designed to direct part of the light entering the projection lens (100) and exiting via the active surfaces of the free-form lenses to a region above the asymmetrical cut-off line of the dipped beam distribution.

14 Claims, 3 Drawing Sheets

(51) Int. Cl.

| | |
|---|---|
| ***F21S 41/32*** | (2018.01) |
| *F21W 102/18* | (2018.01) |

(56) References Cited

FOREIGN PATENT DOCUMENTS

| | | | | | |
|---|---|---|---|---|---|
| DE | 102012107426 | A1 | | 2/2014 | |
| EP | 2578929 | A2 | | 4/2013 | |
| EP | 3616994 | A1 | * | 3/2020 | ............ F21S 41/275 |
| FR | 2770617 | A1 | * | 5/1999 | .......... F21S 48/1258 |

OTHER PUBLICATIONS

Search Report for European Patent Application No. 20198338.4, dated Mar. 12, 2021 (10 pages).

* cited by examiner

ILLUMINATION DEVICE FOR A MOTOR VEHICLE HEADLIGHT

The invention relates to an illumination device for a motor vehicle headlight, which illumination device comprises the following:

- at least one light module for producing dipped beam distribution having at least one light source, which is designed to emit light,
- a bulb shield having an optically relevant shield edge for producing a cut-off line, wherein the light module is arranged on an upper side of the bulb shield in the installed position of the illumination device in a motor vehicle headlight and cooperates in combination with the optically relevant shield edge of the bulb shield to produce dipped beam distribution,
- a projection lens with an optical axis, which projection lens is designed to image the light that can be produced by the light module in front of the illumination device in a main emission direction, wherein the projection lens has a light entry surface and a convex light emitting surface opposite the light entry surface, The invention further relates to a motor vehicle headlight having at least one illumination device according to the invention.

This area of light distribution above the cut-off line is also called the overhead or sign light area (derived from the visibility of traffic signs).

The legal measurement points in this area range up to 4° above the horizon and are characterized by minimum and maximum values as well as so-called sum values for the illumination intensity occurring in each of the measurement points.

Projection systems with dipped beam function have very little light above the cut-off line due to the system as this overhead area is effectively shadowed by the bulb shield used in projection systems.

Due to the effective shadowing, special measures are required to adequately illuminate these measurement points with suitable amounts of light. At the same time, care must be taken to ensure compliance with specified maximum values in the vicinity of the cut-off line. These maximum values are also known as “glare values”.

The optical device is generally a modification of the “original” lens entry or light emitting surface of the projection lens, wherein a wide variety of modifications are generally possible for directing light to an area above the cut-off line.

A fundamental problem associated with all known solutions having such optical devices is that the directed beams are concentrated in a relatively small area such that, on the one hand, too much light reaches this area and, on the other hand, other areas have light values that are too low, i.e. that this area is not uniformly illuminated by the known solutions.

It is an object of the invention to provide an improved illumination device.

This object is achieved by virtue of the fact that the projection lens comprises an optical device arranged on the projection lens, which comprises a plurality of free-form lenses each having an active surface, wherein the optical device is designed to direct part of the light entering the projection lens and exiting via the active surfaces of the free-form lenses to a region above the asymmetrical cut-off line of the dipped beam distribution.

The targeted selection of the active surfaces and their course on the projection lens enables the widest possible and most uniformly illuminated sign light in the dipped beam distribution.

It can be provided that the optical device is arranged on the light emitting surface of the projection lens and forms a manipulated part of the light emitting surface deviating from the convex light emitting surface.

It can be provided that the active surface of a respective free-form lens and the light emitting surface form a starting edge in a common surface section line, wherein the active surface, starting from the starting edge, extends away from the light emitting surface along two side edges up to a slope edge opposite the starting edge, preferably in the direction of the main emission direction, which slope edge has a first end and a second end, wherein the first end has a first distance to the light emitting surface along a surface normal in an orthogonal projection onto the light emitting surface, and wherein the second end has a second distance to the light emitting surface along a surface normal in an orthogonal projection onto the light emitting surface.

It can be provided that the free-form lenses of the optical device are arranged next to each other in a horizontal row in the installation position of the illumination device in a motor vehicle headlight, wherein the first distance of the active surfaces, starting from a first free-form lens of the horizontally arranged free-form lenses, in the course up to a last free-form lens is initially smaller than the second distance, wherein the first distance increases in the course to the optical axis and the second distance decreases such that the first distance of the free-form lenses in the region of the optical axis is the same as the second distance, wherein the first distance continues to increase in the course away from the optical axis and the second distance continues to decrease.

It can be provided that the optical device is arranged on the light entry surface of the projection lens and forms a manipulated part of the light entry surface deviating from the light entry surface.

It can be provided that the free-form lenses are arranged next to each other in several parallel rows.

It can be provided that the active surface of a respective free-form lens and the light entry surface form a starting edge in a common surface section line, wherein the active surface, starting from the starting edge, extends away from the light entry surface along two side edges up to a slope edge opposite the starting edge, which slope edge has a first end and a second end, wherein the first end has a first distance to the light entry surface along a surface normal in an orthogonal projection onto the light entry surface, and wherein the second end has a second distance to the light entry surface along a surface normal in an orthogonal projection onto the light entry surface.

It can be provided that the first and second distance of an active surface are the same size, wherein the first and second distance of every active surface are preferably the same size.

It can be provided that the free-form lenses of the optical device are arranged with respect to each other in such a way that a logo, for example a manufacturer’s logo, is formed.

It can be provided that the free-form lenses are arranged directly next to each other in a line.

It can be provided that the active surfaces are curved.

It can be provided that the cut-off line is asymmetrical or straight.

This object is also achieved by a motor vehicle headlight having at least one illumination device according to the invention.

Figure 2:
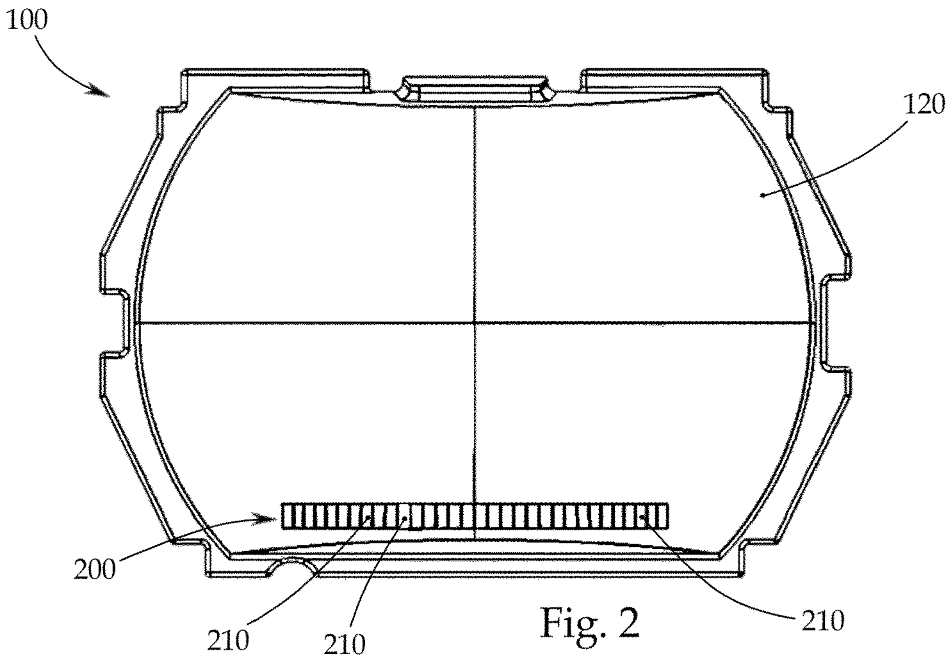
Figure 3:
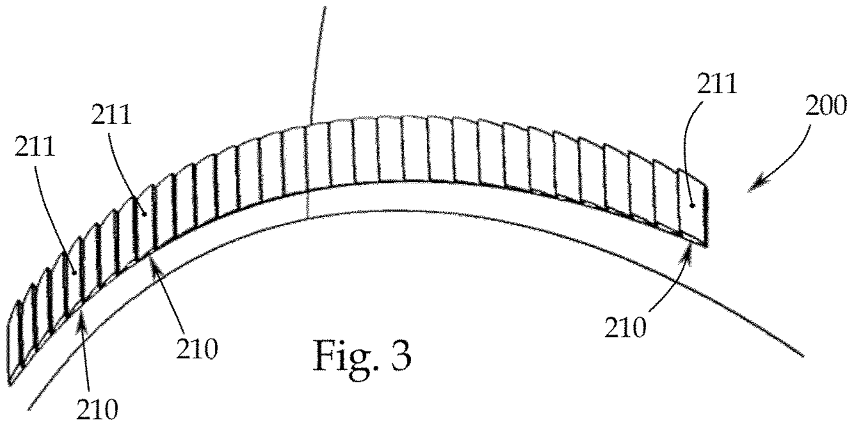
Figure 4A:
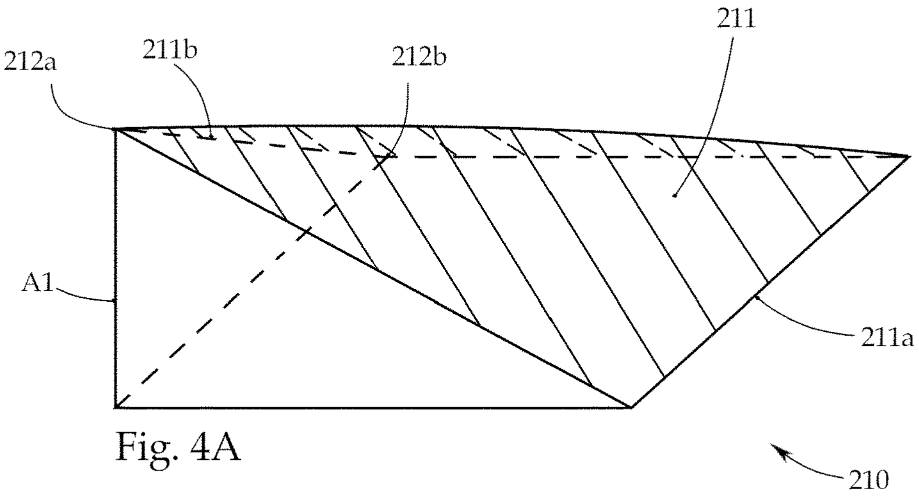
Figure 4B:
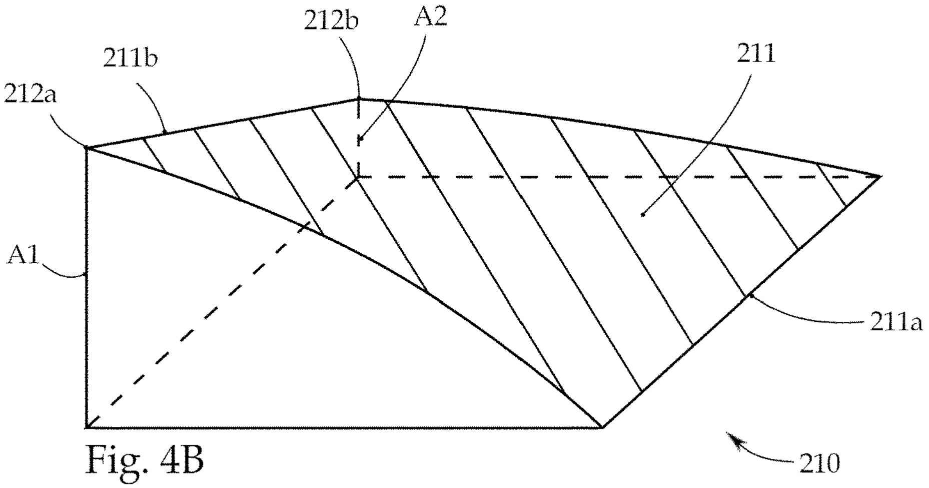
Figure 4C:
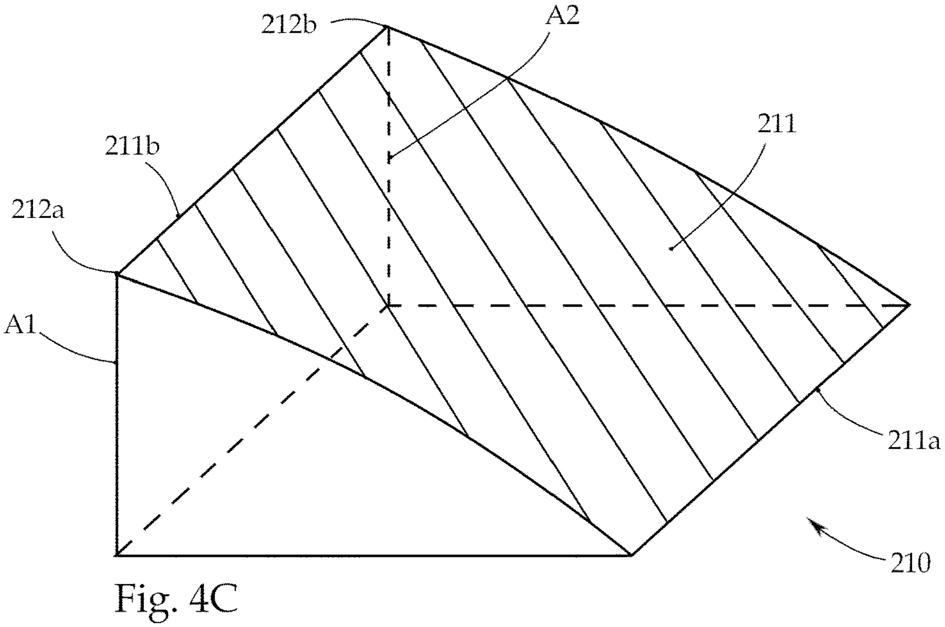
Figure 5:
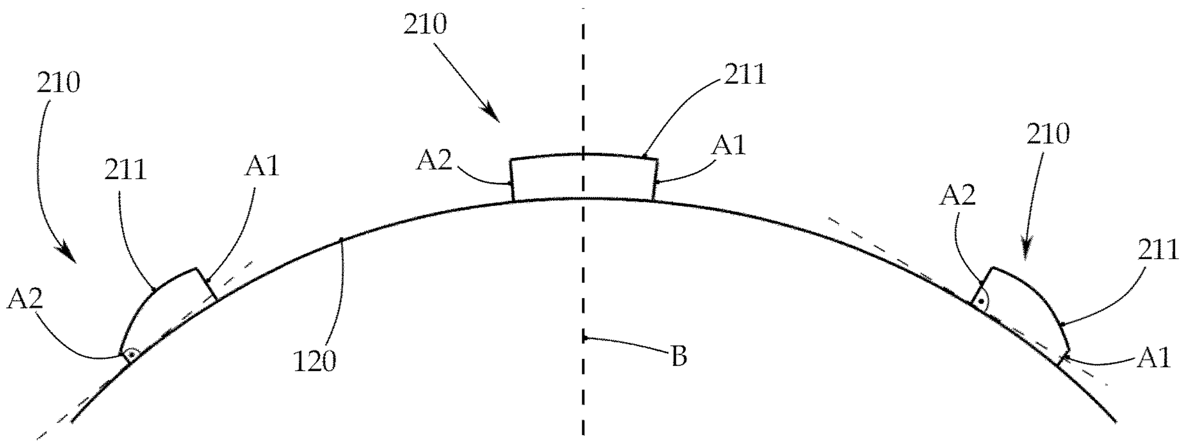

The invention is explained below in more detail based on exemplary drawings. In the drawings, FIG. 1 shows an exemplary illumination device in a side view, wherein the illumination device comprises a light module, wherein the light of the light module can be projected in front of the illumination device via a bulb shield by means of a projection lens, FIG. 2 shows a front view of the projection lens from FIG. 1, wherein the projection lens comprises an optical device, which has several free-form lenses, FIG. 3 shows a perspective view of the optical device from FIG. 3, FIG. 4A shows an exemplary free-form lens in a perspective view, FIG. 4B shows a further exemplary free-form lens in a perspective view, FIG. 4C shows a further exemplary free-form lens in a perspective view, and FIG. 5 shows a sectional view of the projection lens and the optical device from above.

FIG. 1 shows an exemplary illumination device 10 for a motor vehicle headlight, which illumination device comprises a light module 11 for producing dipped beam distribution having at least one light source.

Furthermore, the illumination device 10 comprises a bulb shield 20 having an optically relevant shield edge for producing an asymmetrical cut-off line, wherein the light module 11 is arranged on an upper side of the bulb shield 20 in the installed position of the illumination device 10 in a motor vehicle headlight and cooperates in combination with the optically relevant shield edge of the bulb shield 20 to produce dipped beam distribution.

Furthermore, the illumination device comprises a projection lens 100 with an optical axis B, which projection lens 100 is designed to image the light that can be produced by the light module in front of the illumination device 10 in a main emission direction, wherein the projection lens 100 has a light entry surface 110 and a convex light emitting surface 120 opposite the light entry surface 110.

On the projection lens 100, an optical device 200 is arranged on the light emitting surface 120, wherein the optical device 200 forms a manipulated part of the light emitting surface deviating from the convex light emitting surface 120, which comprises a plurality of free-form lenses 210 each having an active surface 211, as seen in FIG. 2 and FIG. 3, wherein the optical device 200 is designed to direct part of the light entering the projection lens 100 and exiting via the active surfaces 211 of the free-form lenses to a region above the asymmetrical cut-off line of the dipped beam distribution.

FIGS. 4A to 4C show exemplary embodiments of the free-form lenses 210, wherein the active surface 211 of a respective free-form lens 210 and the light emitting surface 120 form a starting edge 211*a* in a common surface section line, wherein the active surface 211, starting from the starting edge 211*a*, extends away from the light emitting surface 120 along two side edges up to a slope edge 211*b* opposite the starting edge 211*a*, preferably in the direction of the main emission direction, which slope edge 211*b* has a first end 212*a* and a second end 212*b*, wherein the first end 212*a* has a first distance A1 to the light emitting surface 120 along a surface normal in an orthogonal projection onto the light emitting surface 120, and wherein the second end 212*b* has a second distance A2 to the light emitting surface 120 along a surface normal in an orthogonal projection onto the light emitting surface 120. The active surfaces are curved, preferably curved differently.

In the exemplary embodiment shown in FIG. 4A, the first distance A1 is greater than the second distance A2, wherein the second distance A2 is zero.

In the exemplary embodiment shown in FIG. 4B, the first distance A1 is greater than the second distance A2.

In the exemplary embodiment shown in FIG. 4C, the first distance A1 is the same size as the second distance A2.

In the example shown in the figures, the free-form lenses 210 of the optical device 200 are arranged next to each other in a horizontal row in the installation position of the illumination device 10 in a motor vehicle headlight, wherein the first distance A1 of the active surfaces 211, starting from a first free-form lens of the horizontally arranged free-form lenses, in the course up to a last free-form lens is initially smaller than the second distance A2, wherein the first distance A1 increases in the course to the optical axis B and the second distance A2 decreases such that the first distance A1 of the free-form lenses in the region of the optical axis B is the same as the second distance A2, wherein the first distance A1 continues to increase in the further course away from the optical axis B and the second distance A2 continues to decrease, as sketched out in FIG. 5, which shows the projection lens 100 and the optical device 200 from above.

Furthermore, it is also possible that the optical device 200 in another example is arranged on the light entry surface 110 of the projection lens 100, wherein the free-form lenses 210 are arranged next to each other in several parallel rows.

The active surface 211 of a respective free-form lens 210—similar to the example shown in the figures—and the light entry surface 110 form a starting edge in a common surface section line, wherein the active surface 211, starting from the starting edge 211*a*, extends away from the light entry surface 110 along two side edges up to a slope edge 211*b* opposite the starting edge 211*a*, which slope edge 211*b* has a first end and a second end, wherein the first end has a first distance A1 to the light entry surface 120 along a surface normal in an orthogonal projection onto the light entry surface 110, and wherein the second end 212*b* has a second distance A2 to the light emitting surface 120 along a surface normal in an orthogonal projection onto the light entry surface 120.

In this case, the first and second distance A1, A2 of an active surface 211 are the same size, wherein the first and second distance A1, A2 of every active surface 211 are preferably the same size.

It can, for example, be provided that the free-form lenses 210 of the optical device 200, in the case that the optical device is arranged on the light entry surface 110, are arranged with respect to each other in such a way that a logo, for example a manufacturer's logo, is formed.

REFERENCE LIST

| | |
|---|---|
| Illumination device . . . | 10 |
| Light module . . . | 11 |
| Bulb shield . . . | 20 |
| Projection lens . . . | 100 |
| Light entry surface . . . | 110 |
| Light emitting surface . . . | 120 |
| Optical device . . . | 200 |
| Free-form lens . . . | 210 |
| Active surface . . . | 211 |
| Starting edge . . . | 211a |
| Slope edge . . . | 211b |
| First end . . . | 212a |
| Second end . . . | 212b |

-continued

| | REFERENCE LIST |
|---|---|
| First distance . . . | A1 |
| Second distance . . . | A2 |
| Optical axis . . . | B |

The invention claimed is:

1. An illumination device (10) for a motor vehicle headlight, which illumination device (10) comprises:

at least one light module (11) for producing dipped beam distribution having at least one light source, which is designed to emit light;

a bulb shield (20) having an optically relevant shield edge for producing a cut-off line, wherein the light module (11) is arranged on an upper side of the bulb shield (20) in the installed position of the illumination device (10) in a motor vehicle headlight and cooperates in combination with the optically relevant shield edge of the bulb shield (20) to produce dipped beam distribution; and a projection lens (100) with an optical axis (B), which projection lens (100) is designed to image the light that can be produced by the light module in front of the illumination device (10) in a main emission direction, wherein the projection lens (100) has a light entry surface (110) and a convex light emitting surface (120) opposite the light entry surface (110), wherein the projection lens (100) comprises an optical device (200) arranged on the projection lens, which comprises a plurality of free-form lenses (210) each having an active surface (211), wherein the optical device is designed to direct part of the light entering the projection lens (100) and exiting via the active surfaces of the free-form lenses to a region above the cut-off line of the dipped beam distribution, wherein the optical device (200) is arranged on the light emitting surface (120) of the projection lens (100) and forms a manipulated part of the light emitting surface (120) deviating from the convex light emitting surface (120), and wherein the active surface (211) of a respective free-form lens (210) and the light emitting surface (120) form a starting edge (211*a*) in a common surface section line, wherein the active surface (211), starting from the starting edge (211*a*), extends away from the light emitting surface (120) along two side edges up to a slope edge (211*b*) opposite the starting edge (211*a*), which slope edge (211*b*) has a first end (212*a*) and a second end (212*b*), wherein the first end (212*a*) has a first distance (A1) to the light emitting surface (120) along a surface normal in an orthogonal projection onto the light emitting surface (120), and wherein the second end (212*b*) has a second distance (A2) to the light emitting surface (120) along a surface normal in an orthogonal projection onto the light emitting surface (120).

2. The illumination device according to claim 1, wherein the free-form lenses (210) of the optical device (200) are arranged next to each other in a horizontal row in the installation position of the illumination device (10) in a motor vehicle headlight, wherein the first distance (A1) of the active surfaces (211), starting from a first free-form lens of the horizontally arranged free-form lenses, in the course up to a last free-form lens is initially smaller than the second distance (A2), wherein the first distance (A1) increases in the course to the optical axis (B) and the second distance (A2) decreases such that the first distance (A1) of the free-form lenses in the region of the optical axis (B) is the same as the second distance (A2), wherein the first distance (A1) continues to increase in the course away from the optical axis (B) and the second distance (A2) continues to decrease.

3. The illumination device according to claim 1, wherein the optical device (200) is arranged on the light entry surface (110) of the projection lens (100) and forms a manipulated part of the light entry surface (110) deviating from the light entry surface (110).

4. The illumination device according to claim 3, wherein the free-form lenses (210) are arranged next to each other in several parallel rows.

5. The illumination device according to claim 4, wherein the active surface (211) of a respective free-form lens (210) and the light entry surface (110) form a starting edge (211*a*) in a common surface section line, wherein the active surface (211), starting from the starting edge (211*a*), extends away from the light entry surface (110) along two side edges up to a slope edge (211*b*) opposite the starting edge (211*a*), which slope edge (211*b*) has a first end (212*a*) and a second end (212*b*), wherein the first end (212*a*) has a first distance (A1) to the light entry surface (120) along a surface normal in an orthogonal projection onto the light entry surface (110), and wherein the second end (212*b*) has a second distance (A2) to the light entry surface (110) along a surface normal in an orthogonal projection onto the light entry surface (110).

6. The illumination device according to claim 5, wherein the first and second distance (A1, A2) of an active surface (211) are the same size.

7. The illumination device according to claim 4, wherein the free-form lenses (210) of the optical device (200) are arranged with respect to each other in such a way that a logo is formed.

8. The illumination device according to claim 1, wherein the free-form lenses (210) are arranged directly next to each other in a line.

9. The illumination device according to claim 1, wherein the active surfaces (211) are curved.

10. The illumination device according to claim 1, wherein the cut-off line is asymmetrical or straight.

11. A motor vehicle headlight having at least one illumination device in accordance with claim 1.

12. The illumination device according to claim 1, wherein the active surface (211) extends in the direction of the main emission direction.

13. The illumination device according to claim 6, wherein the first and second distance (A1, A2) of every active surface (211) are the same size.

14. The illumination device according to claim 7, wherein the logo is a manufacturer's logo.

* * * * *